(12) United States Patent
Phillips et al.

(10) Patent No.: US 7,086,414 B2
(45) Date of Patent: Aug. 8, 2006

(54) GAS BOTTLE ASSEMBLY

(75) Inventors: Robert John Phillips, Feniton (GB); Terence Oborne, Yeovil (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 124 days.

(21) Appl. No.: 10/752,117

(22) Filed: Jan. 6, 2004

(65) Prior Publication Data

US 2004/0134536 A1     Jul. 15, 2004

(30) Foreign Application Priority Data

Jan. 7, 2003    (GB) ................................ 0300218.5

(51) Int. Cl.
     *G05D 16/10*      (2006.01)
(52) U.S. Cl. ................................. 137/505.35
(58) Field of Classification Search ........... 137/505.35, 137/505.42
See application file for complete search history.

(56) References Cited

U.S. PATENT DOCUMENTS

| | | | | |
|---|---|---|---|---|
| 2,016,234 A | * | 10/1935 | Hughes ................. | 137/505.12 |
| 3,451,431 A | * | 6/1969 | Royer ................... | 137/505.35 |
| 3,814,543 A | * | 6/1974 | Gritz .................... | 137/505.44 |
| 3,885,589 A | * | 5/1975 | Iung ..................... | 137/505.35 |
| 5,358,004 A | * | 10/1994 | Atkinson et al. ...... | 137/505.18 |
| 5,520,214 A | * | 5/1996 | Mack et al. ........... | 137/505.34 |
| 6,378,551 B1 | * | 4/2002 | Long ........................... | 137/495 |

FOREIGN PATENT DOCUMENTS

| | | |
|---|---|---|
| FR | 2082455 | 12/1971 |
| FR | 2123892 | 9/1972 |
| FR | 2250940 | 6/1975 |
| GB | 773019 | 4/1957 |

* cited by examiner

*Primary Examiner*—Stephen M. Hepperle
(74) *Attorney, Agent, or Firm*—MacMillan, Sobanski & Todd, LLC

(57) ABSTRACT

A gas bottle assembly includes a container for containing a pressurized gas, and an operating head, the operating head including a valve member which in the absence of any demand for the gas, is positioned close to a valve seat such as to permit only a minimal flow of gas from the container past the valve seat, and an actuator moveable to move the valve member away from the valve seat thereby to permit a greater flow of gas past the valve seat, to an outlet for use, and wherein the actuator includes a plunger with which the valve member is integral or to which the valve member is affixed, and the actuator includes a piston part which is movable in a piston chamber in one direction in response an actuator spring acting at a first side of the piston part, to move the valve member away from the seat, and in an opposite direction in response to a combination of gas pressure and a valve return spring which is located in the piston chamber at a second opposite side of the piston part to the actuator spring.

7 Claims, 2 Drawing Sheets

GAS BOTTLE ASSEMBLY

BACKGROUND TO THE INVENTION

This invention relates to a gas bottle assembly which includes a container for containing a pressurized gas such as oxygen, and an operating head.

DESCRIPTION OF THE PRIOR ART

A gas bottle assembly is known in which the operating head includes a valve member which in the absence of any demand for the gas, is positioned close to a valve seat such as to permit only a minimal flow of gas from the container past the valve seat. In the event of a demand for the gas, an actuator is moved by an actuating spring to act upon the valve member to cause the valve member to move away from the valve seat, thereby to permit a greater flow of gas, past the valve seat, to an outlet for use.

When there is no demand for gas, the effect of the actuating spring is counteracted by the pressure of the minimal gas flow acting on a diaphragm, and also a valve spring which acts on the valve member, to maintain the valve member close to the valve seat. When there is a demand for the gas, the gas pressure on the diaphragm is relieved by an amount depending upon the demand and the actuator spring overcomes the effect of the valve spring to move the valve member away from the valve seat. When demand ceases again, the pressure of the gas on the valve member, and the effect of the valve spring, together act to move the valve member back towards the valve seat to its close position.

In such an assembly, the valve spring is provided in a flow path for the gas from the container which is not ideal, and also by virtue of the use of a diaphragm on which the gas pressure acts to counteract the actuator spring, the actuator may fluctuate in response to fluctuations in the demand pressure. Particularly as the valve member is a separate part to the actuator, fluctuating actuator movements may result in the valve member instability with respect to the valve seat.

Another problem with using a diaphragm with a resilient, rubber or the like, part is the potential build up of static electricity as the diaphragm operates.

SUMMARY OF THE INVENTION

According to the invention we provide a gas bottle assembly including a container for containing a pressurized gas such as oxygen, and an operating head, the operating head including a valve member which in the absence of any demand for the gas, is positioned such as to permit only a minimal flow of gas from the container past the valve seat, and an actuator moveable to move the valve member away from the valve seat thereby to permit a greater flow of gas past the valve seat, to an outlet for use, and wherein the actuator includes a plunger with which the valve member is integral or to which the valve member is affixed, and the actuator includes a piston part which is movable in a piston chamber in one direction in response an actuator spring acting at a first side of the piston part, to move the valve member away from the seat, and in an opposite direction in response to a combination of gas pressure and a valve return spring which is located in the piston chamber at a second opposite side of the piston to the actuator spring.

Thus in the assembly of the invention the problems of the known assembly are overcome or reduced. By providing an actuator with a piston part on which the gas pressure acts, and an integral or affixed valve member, instability of the valve member with respect to the valve seat in response to demand pressure fluctuations is negated. Also, positioning a valve return spring in the piston chamber rather than in a gas flow path to the outlet, provides a more desirable location as no diaphragm is provided, there is no risk of static build up.

In one embodiment, the operating head includes a main passage which communicates with the container, and an outlet passage with communicates with the outlet, the main and outlet passages communicating via the valve seat. Preferably the outlet passage communicates with the piston chamber at the second side of the piston part via a restricted passage or orifice, so that the pressure in the outlet passage is communicated to the second side of the piston.

BRIEF DESCRIPTION OF THE DRAWINGS

Embodiments of the invention will now be described with reference to the accompanying drawings in which.

DETAILED DESCRIPTION OF THE INVENTION

Figure 1:
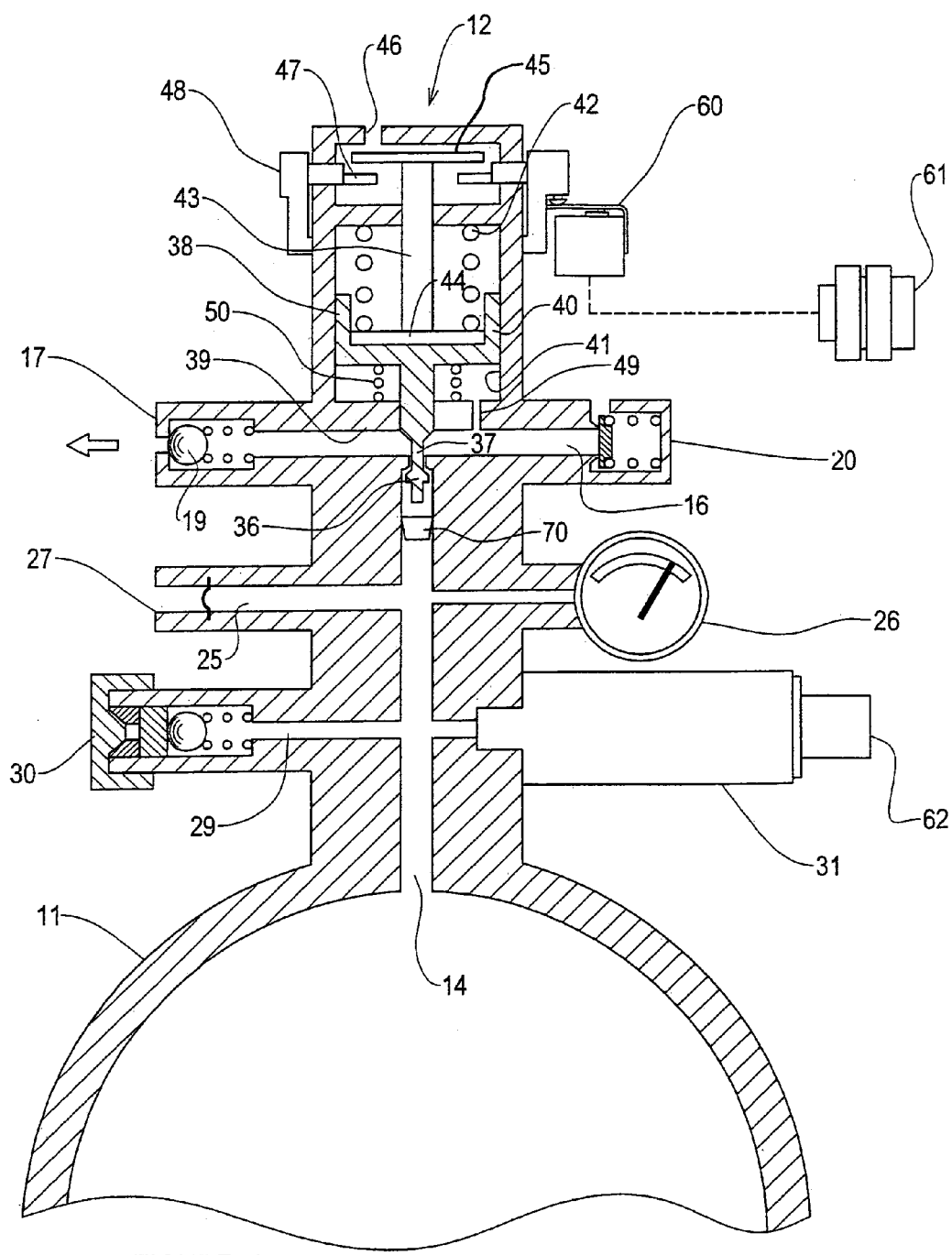
FIG. 1 is a side cross sectional view through part of a gas bottle assembly in accordance with the invention.

Referring to the drawings, a gas bottle assembly 10 includes a container 11 for pressurized gas, and an operating head 12.

As is well known in the art, the container 11 is typically made of metal and is in a generally cylindrical shape able to contain gas at pressures of up to say, 1800 psi.

In this example the operating head 12 is integral with the container 11 but may be separate from and secured to the container 11 as required.

The operating head 12 includes a main passage 14 which communicates via a valve seat 15 with an outlet passage 16 which extends to an outlet 17 where there is a spring biased outlet valve 19. In this example the outlet valve 19 is provided by a ball which is spring biased into engagement with a valve seat. The outlet 17 is adapted to be connected to a supply, e.g. via a hose, for example via a self sealing quick connecting coupling, or another union, when the ball 19 will be moved away from its seat. Thus flow of gas from the bottle assembly 10 can be controlled by a downstream breathing regulator for example, where the gas is oxygen and the assembly 10 is for providing a supply of breathable gas, for example in an emergency situation. For example the assembly 10 may be provided to supply breathable gas in an aircraft in the event of an emergency de-pressurization, a pilot ejecting (in which case the assembly 10 would be provided in or on the ejected seat or other ejected mechanism), or failure or malfunction of another on-board breathable gas supply system. However the invention may of course be applied to other gas systems as desired.

The outlet passage 16 in this example extends transversely to the main passage 14, with the outlet 17 at one end. At an opposite end of the outlet passage 16, there is provided a low pressure relief valve 20, which maintains the pressure in the outlet passage 16 below a maximum threshold pressure, as is conventional.

The operating head 12 further includes other conventional features, such as an ancillary passage 25 which enables a pressure gauge 26 to indicate the gas pressure in the container 11, and a safety over-pressure valve 27 to be provided, shown here to be of the bursting disc type, which prevents overfilling of the container 11 beyond its design capabilities, and a fill passage 29 which includes a high pressure charging valve 30 to enable the container 11 to be charged. Further as is conventional there is provided a pressure transducer 31 which communicates with the main passage 14 to enable the gas pressure in the container 11 to be monitored remotely and a warning signal to be issued in the event that the pressure falls below a minimum threshold.

In accordance with the invention there is provided a valve member 36 which is moveable towards and away from the valve seat 15 to control the flow of gas from the container 11 past the valve seat 15 from the main passage 14 into the outlet passage 16.

The valve member 36 is in this example is provided integrally with a plunger 37 of an actuator 38, but the valve member 36 could be a separate component affixed to the plunger 37 if desired. In each case, plunger 37 movement as hereinafter described positively moves the valve member 36.

Figure 1A:
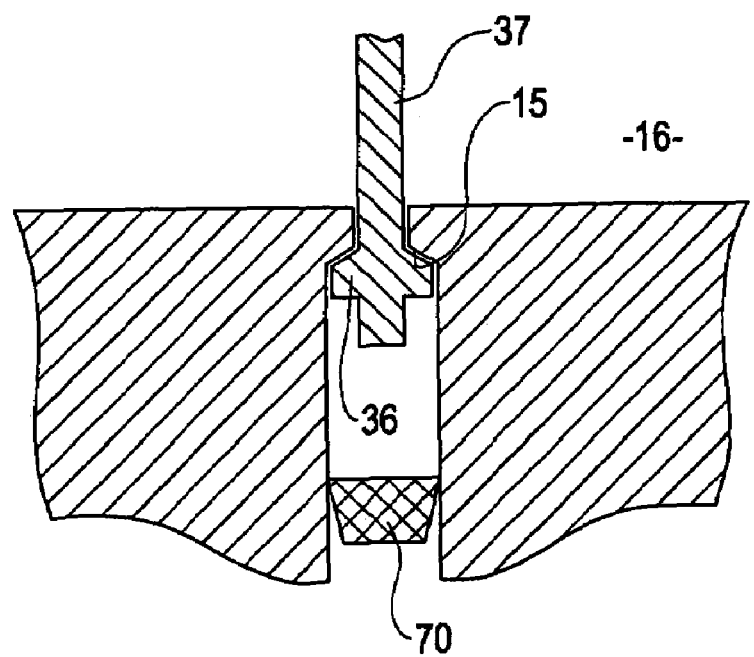
FIG. 1*a* is an enlarged view of part of the assembly of FIG. 1 showing a valve member in one position.
Figure 1B:
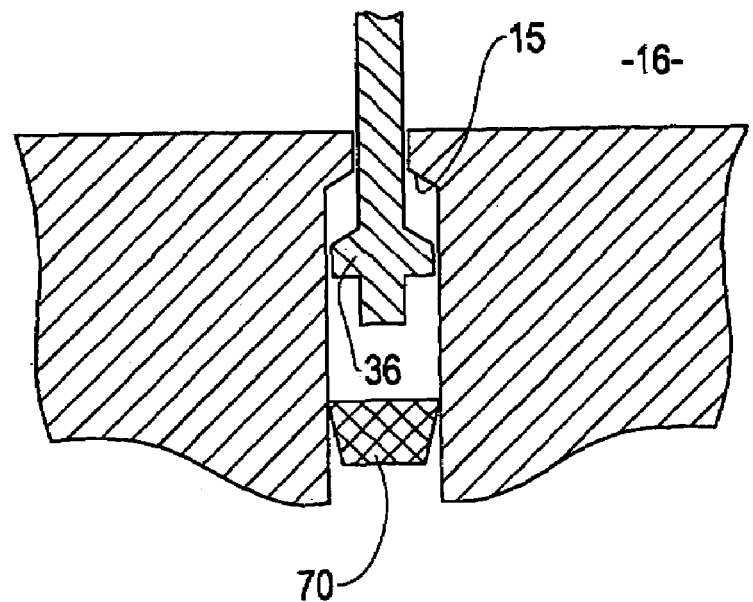
FIG. 1*b* is a view similar to that of FIG. 1*a* but showing the valve member in an alternative position.

In FIG. 1a, the valve member 36 is shown in a position close to the valve seat 15 to which the valve member 36 is moved when there is no demand for gas; in FIG. 1b the valve member 36 is shown moved away from the valve seat 15 in a position to which the valve member 36 typically will be moved when there is a demand for gas.

The actuator 38 includes a piston part 40 which is received for sliding in a piston chamber 41 of the operating head 12. The plunger 37 is fixed to or integral with the piston part 40 as desired, so that the piston part 40, plunger 37 and valve member 36 all move as one. The plunger 37 thus extends from the piston part 40 in the piston chamber 41, through an end wall 39 of the piston chamber 41, through the valve seat 15 to the valve member 36. A valve return spring 50 being a coil spring, is provided in the piston chamber 41 and is carried on the plunger 37 to act between the end wall 39 and the piston part 40.

At a first side of the piston part 40, there is provided an actuator spring 42 which urges the piston part 40 in a direction in the piston chamber 41 to move the valve member 36 away from the valve seat 15 towards the position shown in FIG. 1b. The actuator spring 42 is in this example a coil spring carried on an actuator rod 43. The actuator rod 43 includes at one end, an operating surface 44 which, in use, bears against the piston part 40 to urge the piston part 40 towards the end wall 39, and at the opposite end, the actuator rod 43 has an abutment surface 45. In normal use, the abutment surface 45 is free to move with the actuator rod 43. However, there is provided an on/off switching mechanism 48 which includes a movable stop 47.

The stop 47 in this example is a cam which, when the switching mechanism 48 is rotated on the outside of the operating head 12, engages beneath the abutment surface 45 to move the actuator rod 43 to an off condition in an upward direction as seen in the drawings, away from the container 11, and hence to relieve the effect of the actuator spring 42 to permit the piston part 40 to move upwardly under the force of return spring 50, so that the valve member 36 is urged into sealing engagement with the valve seat 15. The switching mechanism 48 is moved to the off condition during charging of the container 11 for example, or if the bottle assembly 10 is removed from its environment e.g. for maintenance purposes.

The switching mechanism 38 is rotated to bring the cam stop 47 to the on condition shown in the drawings to prime the assembly 10 ready for use, when the assembly 10 is installed or otherwise when there is likely to be a demand for the gas.

When the assembly 10 is primed, when there is no demand for gas, there will be no flow of gas along the outlet passage 16 to the outlet 17. The pressure of gas in the container 11 will act on the valve member 36 to move the valve member 36 towards the FIG. 1a position close to the valve seat 15 but even with the assistance of the valve return spring 50, the valve member 36 will not be in sealing engagement with the valve seat 15 due to the effect of the actuator spring 42. The pressure of the gas in the container 11 will thus be communicated into the outlet passage 16. It can be seen that there is a small orifice or passage 49, extending between the outlet passage 16 and the piston chamber 41 at the second side of the piston part 40. This outlet passage 16 pressure and the effect of the valve return spring 50 provided in the piston chamber 41 at the second side of the piston part 40 will maintain the valve member 36 in the FIG. 1a position close to the valve seat 15 in opposition to the actuator spring 42.

However when there is any demand for gas, for example from a downstream breathing regulator, gas will flow from the outlet passage 16 to the outlet 17 resulting in a relieving of pressure in the outlet passage 16. Because the actuator spring 42 is stronger than the valve return spring 50, the actuator 38 will thus move the valve member 36 positively away from the valve seat 15 by an amount depending on the reduction in pressure in the outlet passage 16 caused by the demand.

Thus gas may more freely flow from the container 11, via the main passage 14 into the outlet passage 16 according to the demand.

If demand again ceases, the pressure in the outlet passage 16 will again build, so that the combined effect of that pressure communicated to the second side of the piston part 40 via the orifice 49 and the effect of the valve spring 50, will move the actuator 38, and hence the valve member 36 back towards the valve seat 15, until it reaches the position illustrated in FIG. 1a again.

Particularly where the assembly 10 is intended for use in positions where the on/off condition of the on/off mechanism 38 cannot be observed, a microswitch 60 may be provided to provide an indication remotely of the on/off condition. Thus in FIG. 1 there is shown an electrical connector 61 for such a microswitch 60 which may be a common or separate connector to an electrical connector 62 provided for the pressure transducer 31 where provided.

As indicated in the figures, a filter 70 may be provided in the main passage 14 to filter any entrained particles in the gas prior to supplying the gas. This is particularly where the assembly 10 is for supplying breathable gas.

Various modifications may be provided without departing from the scope of the invention. For example the main 14 and outlet 16 passages need not be generally perpendicular as illustrated. The valve member 36 and valve seat 15 are each shown to be of frusto-conical configuration but may of any other desired configuration provided that the valve member 36 and seat 15 can control the flow of gas past the valve seat 15 as described.

The actuator 38 need not be of the configuration shown, but may be modified as required, provided that the actuator 38 includes a piston part 40 which moves in a piston chamber 41 in response to the actuator spring 42 in one direction and the combined efforts of the gas pressure and valve spring 50 in an opposite direction positively to move the valve member 36.

In the embodiment shown in the drawings, to permit a minimal flow of gas past the valve seat 15, the valve member 36 is positioned close to but not in sealing engagement with the valve seat 15. In another example, a minimal flow of gas may be permitted past the valve seat 15 when there is no demand, through a small orifice in the valve member 36 or otherwise, although the arrangement shown is preferred as such flow can be stemmed altogether when required by operating the stop 47 as described above.

As shown in the drawings, the valve member 36 and valve seat 15 are each of generally frusto-conical configuration, but in another example, one or both of these may be of an alternative configuration, whilst permitting metering of the gas from the container 11, past the valve seat 15.

It can be seen in FIG. 1 that there is a small opening 46 for gas from the operating head 12, which otherwise could be trapped in the operating head 12 and resist piston part 40 movement against the actuator spring 42.

Instead of such opening 46, the upper end of the operating head 12, as seen in the drawings could be open, and/or one or more other gas escape opening(s) may be provided.

The invention claimed is:

1. A gas bottle assembly including a container for containing a pressurized gas, and an operating head, the operating head including a valve member which in the absence of any demand for the gas, is positioned close to a valve seat such as to permit only a minimal flow of gas from the container past the valve seat, and an actuator moveable to move the valve member away from the valve seat thereby to permit a greater flow of gas, past the valve seat, to an outlet for use, and wherein the actuator includes a plunger with which the valve member is integral or to which the valve member is affixed, and the actuator includes a piston part which is movable in a piston chamber in one direction in response an actuator spring acting at a first side of the piston part, to move the valve member away from the seat, and in an opposite direction in response to a combination of gas pressure and a valve return spring which is located in the piston chamber at a second opposite side of the piston part to the actuator spring.

2. An assembly according to claim 1 wherein the operating head includes a main passage which communicates with the container, and an outlet passage with communicates with the outlet, the main and outlet passages communicating via the valve seat.

3. An assembly according to claim 1 wherein the outlet passage communicates with the piston chamber at the second side of the piston part via a restricted passage or orifice, so that the pressure in the outlet passage is communicated to the second side of the piston.

4. An assembly according to claim 1 wherein the valve member is generally frusto-conical in configuration.

5. An assembly according to claim 1 wherein the plunger extends from the piston part in the piston chamber, through an end wall of the piston chamber, through the valve seat to the valve member, and the valve return spring is a coil spring carried on the plunger and acting between the end wall and the piston part.

6. An assembly according to claim 1 wherein to permit a minimal flow of gas past the valve seat, the valve member is positioned close to but not in sealing engagement with the valve seat.

7. An operating head for a gas bottle assembly which includes a container for containing a pressurized gas and the operating head, the operating head including a valve member which in the absence of any demand for the gas, is positioned close to a valve seat such as to permit only a minimal flow of gas from the container past the valve seat, and an actuator moveable to move the valve member away from the valve seat thereby to permit a greater flow of gas, past the valve seat, to an outlet for use, and wherein the actuator includes a plunger with which the valve member is integral or to which the valve member is affixed, and the actuator includes a piston part which is movable in a piston chamber in one direction in response an actuator spring acting at a first side of the piston part, to move the valve member away from the seat, and in an opposite direction in response to a combination of gas pressure and a valve return spring which is located in the piston chamber at a second opposite side of the piston part to the actuator spring.

* * * * *